US012762447B2

(12) United States Patent

Zhang et al.

(10) Patent No.: US 12,762,447 B2

(45) Date of Patent: Oct. 13, 2026

(54) THERMALIZED STATE PREPARATION METHOD UNDER QUANTUM SYSTEM, DEVICE AND STORAGE MEDIUM

(71) Applicants: Tencent Technology (Shenzhen) Company Limited, Shenzhen (CN); Tsinghua University, Beijing (CN)

(72) Inventors: Shixin Zhang, Shenzhen (CN); Shengyu Zhang, Shenzhen (CN); Hong Yao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 682 days.

(21) Appl. No.: 18/336,671

(22) Filed: Jun. 16, 2023

(65) Prior Publication Data

US 2023/0351238 A1 Nov. 2, 2023

Related U.S. Application Data

(63) Continuation of application No. PCT/CN2022/132997, filed on Nov. 18, 2022.

(30) Foreign Application Priority Data

Dec. 6, 2021 (CN) ......................... 202111479010.4

(51) Int. Cl.
*G06N 10/20* (2022.01)
*G06N 10/60* (2022.01)

(52) U.S. Cl.
CPC ............. *G06N 10/20* (2022.01); *G06N 10/60* (2022.01)

(58) Field of Classification Search
CPC ........ G06N 10/20; G06N 10/40; G06N 10/60; G06N 3/08
See application file for complete search history.

(56) References Cited

U.S. PATENT DOCUMENTS

2020/0372390 A1 11/2020 Shehab et al.
2021/0035007 A1* 2/2021 Martinis ................ G06F 15/80
(Continued)

FOREIGN PATENT DOCUMENTS

CN 113379057 A 9/2021
CN 113408733 A 9/2021
CN 113496285 A 10/2021

OTHER PUBLICATIONS

Giudice, "Rényi free energy and variational approximations to thermal states", Physical Review, published May 17, 2021. (Year: 2021).*

(Continued)

*Primary Examiner* — Dave Misir
(74) *Attorney, Agent, or Firm* — Crowell & Moring LLP

(57) ABSTRACT

A thermalized state preparation method under a quantum system, a device and a storage medium relate to the field of quantum technologies. The method includes: acquiring a transformation process performed by a parameterized quantum circuit on an input quantum state of combined qubits to obtain n sets of measurement results (210); processing the second measurement results through a neural network to obtain weight parameters (220); computing a correlation function value of a mixed state of the target quantum system based on the weight parameters and the first measurement results (230); and computing an expected value of an objective function based on the correlation function value (240); adjusting variational parameters taking an expected value convergence of the objective function as a goal (250); and acquiring, under a condition that the expected value satisfies a convergence condition, the mixed state to approximately characterize a thermalized state of the target quantum system (260).

14 Claims, 6 Drawing Sheets

(56) References Cited

U.S. PATENT DOCUMENTS

| | | | |
|---|---|---|---|
| 2021/0056455 A1 | 2/2021 | Shehab | |
| 2021/0097422 A1* | 4/2021 | Verdon-Akzam ........ | G06N 3/04 |
| 2023/0054868 A1 | 2/2023 | Shixin et al. | |
| 2023/0162079 A1 | 5/2023 | Chen et al. | |

OTHER PUBLICATIONS

International Search Report and Written Opinion issued in International Patent Application No. PCT/CN2022/132997 dated Feb. 2, 2023, w/English translation, 13 pages.
Extended European Search Report issued in European Patent Application No. 22903177.8 dated Aug. 2, 2024, 12 pages.
Communication pursuant to Rules 70(2) and 70a(2) EPC issued in European Patent Application No. 22903177.8 dated Aug. 21, 2024, 1 page.
Zhukov et al. "Quantum error reduction with deep neural network applied at the post-processing stage." Quantum Information Processing 21, No. 3, Nov. 24, 2021, 18 pages.
Zhang et al. "Variational Quantum-Neural Hybrid Eigensolver" Physical Review Letters, Jun. 9, 2021, 15 pages.
Zhang et al. "Variational post-selection for ground states and thermal states simulation" Feb. 12, 2024, 15 pages.
Takeuchi et al. "Hardness of efficiently generating ground states in postselected quantum computation" Physical Review Research, vol. 3, No. 1, Sep. 30, 2021, 8 pages.
Verdon et al. "Quantum Hamiltonian-based models and the variational quantum thermalizer algorithm," Oct. 4, 2019, 21 pages.

* cited by examiner

THERMALIZED STATE PREPARATION METHOD UNDER QUANTUM SYSTEM, DEVICE AND STORAGE MEDIUM

RELATED APPLICATION

The present application is a continuation of PCT application PCT/CN2022/132997, filed Nov. 18, 2022, which claims priority to Chinese Patent Application No. 202111479010.4, filed on Dec. 6, 2021 and entitled "THERMALIZED STATE PREPARATION METHOD UNDER QUANTUM SYSTEM, DEVICE AND STORAGE MEDIUM", which is incorporated herein by reference in its entirety.

FIELD OF THE TECHNOLOGY

The examples of the present subject matter relate to the field of quantum technologies, and in particular, to a thermalized state preparation method under a quantum system, a device and a storage medium.

BACKGROUND

In some existing studies, a scheme for preparing a thermalized state by a parameterized circuit has been proposed. Taking the preparation of a Gibbs thermalized state as an example, a loss function of parameter optimization in the parameterized circuit is Gibbs free energy, and a Gibbs entropy in the Gibbs free energy needs to be measured.

For a conventional scheme for preparing a thermalized state through a parameterized circuit, a mixed state on system qubits is prepared by taking a partial trace from auxiliary qubits. At this time, the Gibbs entropy of the mixed state cannot be directly and efficiently measured because it is a nonlinear logarithmic function of a density matrix, so a state tomography that consumes exponential resources is required. The "exponential resources" here mean that a number of measurements is exponentially related to a number of system qubits, resulting in excessive measurement time.

Therefore, a current scheme for preparing a thermalized state through the parameterized circuit is less efficient.

SUMMARY

Examples of the present subject matter provide a thermalized state preparation method under a quantum system, a device and a storage medium. The technical schemes are described below.

According to an aspect of examples of the present subject matter, a thermalized state preparation method under a quantum system is provided. The method includes:

acquiring a transformation process performed by a parameterized quantum circuit on an input quantum state of combined qubits, and then measuring an output quantum state of the parameterized quantum circuit for n times to obtain n sets of measurement results, wherein the combined qubits include auxiliary qubits and system qubits of a target quantum system, and each set of measurement results includes: first measurement results corresponding to the system qubits, and second measurement results corresponding to the auxiliary qubits, n is a positive integer;

processing the second measurement results through a neural network to obtain weight parameters;

computing a correlation function value of the mixed state of the target quantum system based on the weight parameters and the first measurement results;

computing an expected value of an objective function based on the correlation function value of the mixed state;

adjusting variational parameters by taking an expected value convergence of the objective function as a goal, wherein the variational parameters include at least one of the following: parameters of the parameterized quantum circuit, or parameters of the neural network; and acquiring, under a condition that the expected value of the objective function satisfies a convergence condition, the mixed state of the target quantum system to approximately characterize the thermalized state of the target quantum system.

According to an aspect of the examples of the present subject matter, a thermalized state preparation apparatus under a quantum system is provided. The apparatus includes:

a measurement result acquisition module, configured to acquire a transformation process performed by a parameterized quantum circuit on an input quantum state of combined qubits, and then measure an output quantum state of the parameterized quantum circuit for n times to obtain n sets of measurement results, wherein the combined qubits include auxiliary qubits and system qubits of a target quantum system, and each set of measurement results includes: first measurement results corresponding to the system qubits, and second measurement results corresponding to the auxiliary qubits, n is a positive integer;

a weight parameter acquisition module, configured to process the second measurement results through a neural network to obtain weight parameters;

a correlation function computation module, configured to compute a correlation function value of the mixed state of the target quantum system based on the weight parameters and the first measurement results;

an objective function computation module, configured to compute an expected value of an objective function based on the correlation function value of the mixed state;

a variational parameter adjustment module, configured to adjust variational parameters by taking an expected value convergence of the objective function as a goal, wherein the variational parameters include at least one of the following: parameters of the parameterized quantum circuit, or parameters of the neural network; and a thermalized state acquisition module, configured to acquire, under a condition that the expected value of the objective function satisfies a convergence condition, the mixed state of the target quantum system to approximately characterize the thermalized state of the target quantum system.

According to an aspect of examples of the present subject matter, a computer device is provided. The computer device is configured to implement the thermalized state preparation method under the quantum system. Optionally, the computer device is a quantum computer, or a classical computer, or a hybrid device execution environment of a quantum computer and a classical computer.

According to an aspect of the examples of the present subject matter, a non-transitory computer-readable storage medium is provided. The storage medium has stored thereon a computer program which is loaded and executed by a processor to implement the thermalized state preparation method under the quantum system.

According to an aspect of the examples of the present subject matter, a computer program product is provided. The computer program product or a computer program includes a computer program, which is stored in a non-transitory computer-readable storage medium. A processor reads the computer program from the computer-readable storage medium, and executes the computer program to implement the thermalized state preparation method under the quantum system.

According to an aspect of the examples of the present subject matter, a thermalized state preparation system under a quantum system is provided. The system includes: a parameterized quantum circuit and a computer device, wherein the parameterized quantum circuit is configured to perform a transformation process on an input quantum state of combined qubits to obtain an output quantum state of the parameterized quantum circuit, wherein the combined qubits include auxiliary qubits and system qubits of a target quantum system;

the computer device is configured to acquire and measure the output quantum state of the parameterized quantum circuit for n times to obtain n sets of measurement results, wherein each set of measurement results includes: first measurement results corresponding to the system qubits, and second measurement results corresponding to the auxiliary qubits, n is a positive integer;

the computer device is further configured to process the second measurement results through a neural network to obtain weight parameters; compute a correlation function value of the mixed state of the target quantum system based on the weight parameters and the first measurement results and compute an expected value of an objective function based on the correlation function value of the mixed state;

the computer device is further configured to adjust variational parameters by taking an expected value convergence of the objective function as a goal; and acquire, under a condition that the expected value of the objective function satisfies a convergence condition, the mixed state of the target quantum system to approximately characterize the thermalized state of the target quantum system; the variational parameters include at least one of the following: parameters of the parameterized quantum circuit, or parameters of the neural network.

The technical schemes provided in the examples of the present subject matter may include the following beneficial effects.

In the process of preparing the thermalized state of the target quantum system, a scheme of neural network post-processing is introduced. In this scheme, the parameterized quantum circuit processes the input quantum state of the system qubits and the auxiliary qubits, and then processes the measurement results corresponding to the auxiliary qubits through the neural network to obtain the corresponding weight parameters. The weight parameters are used to approximately characterize a probability in the mixed state, and then the expected value of the objective function is computed based on the constructed correlation function of the mixed state. Taking the expected value convergence of the objective function as the goal, the parameters of the parameterized quantum circuit and the parameters of the neural network are optimized, so that the mixed state of the target quantum system is obtained, under the condition that the expected value of the objective function satisfies the convergence condition, to approximately characterize the thermalized state of the target quantum system. In this scheme, by introducing the weight parameters outputted by the neural network, the weight parameters are used to adjust weights corresponding to different auxiliary qubit measurement results, so as to enhance the expression ability of the overall circuit through trainable parameters of the neural network, thereby achieving an effect of preparing the thermalized state more efficiently and accurately.

DETAILED DESCRIPTION

Figure 1:
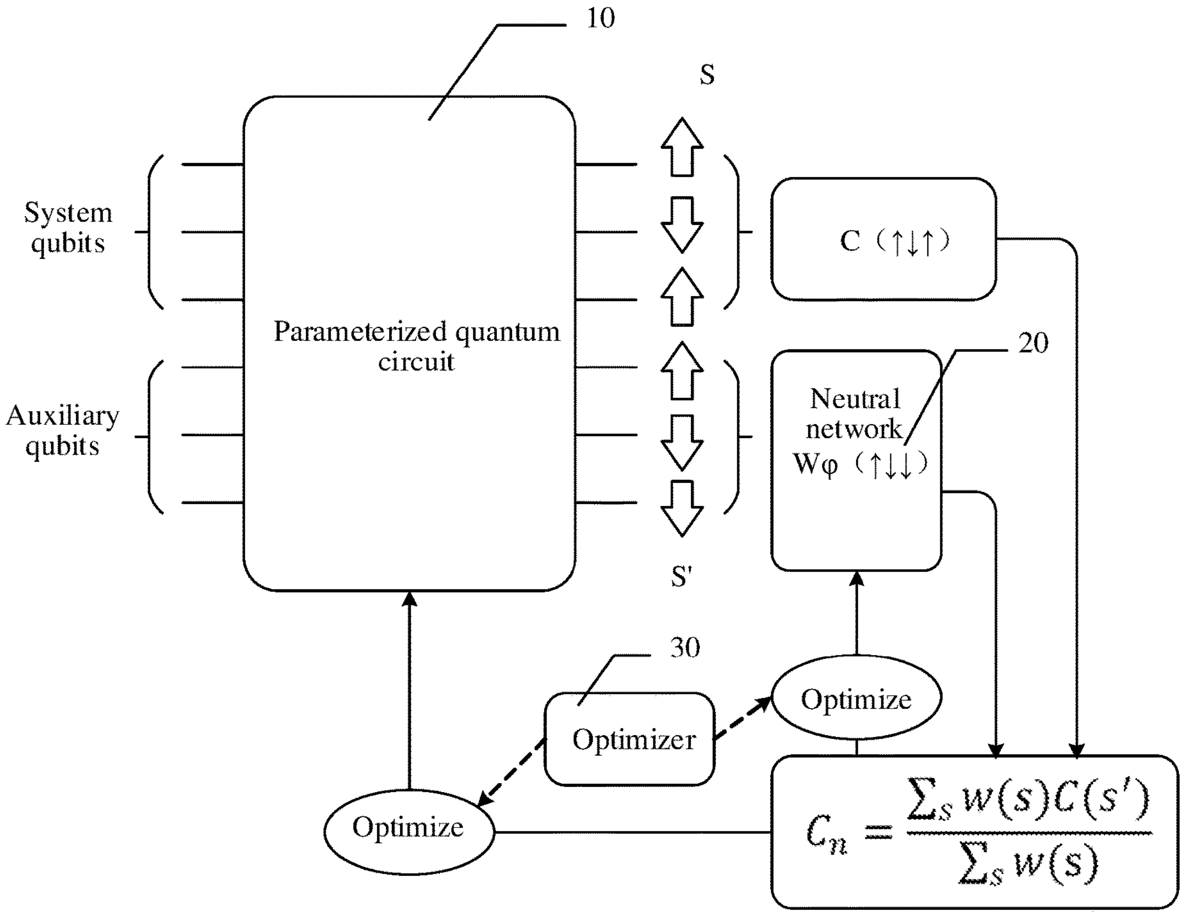
FIG. 1 is a schematic diagram of a thermalized state preparation frame under a quantum system according to an example of the present subject matter.

To make the objectives, technical schemes, and advantages of the present subject matter clearer, the following further describes implementations of the present subject matter in detail with reference to the accompanying drawings.

Before the technical schemes of the present subject matter are introduced, some terms involved in the present subject matter are explained and described first.

1. Quantum computation: a computation mode based on a quantum logic, a basic unit for data storage is a qubit.
2. Qubit: a basic unit for quantum computation. Traditional computers use 0 and 1 as basic units of binary. The difference is that quantum computation can process 0 and 1 at the same time, and the system may be in a linear superposition of 0 and 1: $|\psi\rangle=\alpha|0\rangle+\beta|1\rangle$, where $\alpha$, $\beta$ represent complex probability amplitudes of the system on 0 and 1. Their modulo squares $|\alpha|^2$, $|\beta|^2$ represent the probabilities of is at 0 and 1, respectively.
3. Quantum circuit: a representation of a quantum general-purpose computer that represents a hardware implementation of a corresponding quantum algorithm/program under a quantum gate model. If the quantum circuit contains adjustable parameters that control a quantum gate, it is called a parameterized quantum circuit (PQC) or a variational quantum circuit (VQC), both of which are of the same concept.
4. Hamiltonian: a matrix of Hermite conjugations that describes the total energy of the quantum system. The Hamiltonian is a physical term as an operator that describes the total energy of the system, generally expressed as H.

5. Eigenstate: for a Hamiltonian matrix H, which satisfies an equation: $H|\psi\rangle=E|\psi\rangle$, where a solution of the equation is called an eigenstate $|\psi\rangle$ of H and has an eigenenergy E. A ground state corresponds to the lowest energy eigenstate of the quantum system.
6. Quantum classical hybrid computation: a computational paradigm in which an inner layer uses a quantum circuit (such as PQC) to calculate a corresponding physical quantity or loss function, and an outer layer uses a traditional classical optimizer to adjust a variational parameter of the quantum circuit, which can maximize the advantages of quantum computation and is believed to be one of the important directions with potential to prove quantum advantages.
7. Noisy intermediate-scale quantum (NISQ): recent medium-scale noisy quantum hardware, which is focused in a stage of quantum computation development and researches currently. At this stage, the quantum computation cannot be applied as an engine application for general-purpose computation due to the limitations of scale and noise, but in some cases, can already surpass strongest classical computers, and is therefore often called quantum supremacy or quantum superiority.
8. Variational quantum eigensolver (VQE): a typical quantum classical hybrid computation paradigm with wide applications in the field of quantum chemistry, in which the ground state energy of a specific quantum system is estimated through a variational circuit (that is, PQC/VQC).
9. Post-selection: a measurement result outputted by a quantum computer, which is called post-selection for which the measurement result is selected to be retained or discarded based on a specific value of a bit string corresponding to some bits. The post-selection appears in many current research hotspots, including but not limited to: linear combinations of unitary operations (linear combination operator), entangled entropy phase transitions caused by measurement, and the like.
10. Pauli string: a term consisting of direct products of a plurality of Pauli matrices at different lattice points, where the general Hamiltonian may generally be broken down into a sum of a set of Pauli strings. VQE measurements are also generally performed item by item according to Pauli string decomposition.
11. Non-unitary: a so-called unitary matrix that satisfies all the matrices of $U\dagger U=I$, where all the evolution processes directly allowed by quantum mechanics can be described by the unitary matrix. U is the unitary matrix, also known as a u matrix, and the like, and $U^\dagger$ is a conjugate transpose of U. In addition, matrices that do not satisfy this condition are non-unitary, which can be realized experimentally through auxiliary means or even more exponential resources, but non-unitary matrices often have stronger expression ability and faster ground state projection effect. The above "more exponential resources" refers that the demand for resources increases exponentially with the increase in the number of qubits, or may also refer that the total number of quantum circuits that need to be measured is exponentially multiple, that is, correspondingly increasing the computation time of more exponents.
12. Bit string: a string of numbers consisting of 0, 1. The classical results obtained for each measurement of the quantum circuit may be represented by 0 and 1 according to upper and lower spin configurations on a measurement base, so that one total measurement result corresponds to one bit string.
13. Pauli operator: also known as a Pauli matrix, which is a set of three 2×2 unitary Hermite matrices (also known as unitary matrices), generally represented by a Greek letter σ (sigma). A Pauli X operator is $$\sigma_x = \begin{bmatrix} 0 & 1 \\ 1 & 0 \end{bmatrix},$$

a Pauli Y operator is $$\sigma_y = \begin{bmatrix} 0 & -i \\ i & 0 \end{bmatrix},$$

and a Pauli Z operator is $$\sigma_z = \begin{bmatrix} 1 & 0 \\ 0 & -1 \end{bmatrix}.$$

14. Mixed state: corresponding to a pure state represented by a wave function, described by a set of $\{p_i, |\psi_i\rangle\}$, and meaning a classical probability having $p_i$ in the system is in a wave function $|\psi_i\rangle$ state. This state may be described in terms of a mathematical structure of a density matrix ρ, which is defined as $\rho=\Sigma_i p_i|\psi_i\rangle\langle\psi_i|$.
15. Gibbs thermalized state: a quantum mixed state that satisfies a thermal equilibrium distribution, that is, its classical probability satisfies a Boltzmann distribution $p_i=e^{-\beta E_i}/Z$, where Z is a partition function (normalization factor), $$\beta = \frac{1}{T}$$

is the reciprocal of a system temperature, and $E_i$ is an eigenenergy spectrum of a physical system. The Gibbs thermalized state may be expressed as $$\rho = \frac{e^{-\beta H}}{Tr\ e^{-\beta H}}$$

more succinctly using a matrix index of Hamiltonian H. If the Gibbs thermalized state may be prepared efficiently, the physical properties and correlation function measurements of a finite temperature-heat equilibrium system can be achieved. The Gibbs thermalized state is also the following mixed state ρ having a Gibbs entropy in case of a minimum free energy loss function:

$$F_G(\rho) = Tr(H\rho) - \frac{1}{\beta}(-Tr(\rho \ln \rho));$$

where a first term $Tr(H\rho)$ of the equation is an energy term, a second term $$-\frac{1}{\beta}(-Tr(\rho \ln \rho))$$

may be simplified to $$-\frac{1}{\beta}S,$$

and S is called the Gibbs entropy. The Gibbs entropy is a general expression of an entropy of a system under thermodynamic equilibrium in an equilibrium state. If the system has n energy levels, a probability of accounting for the $i^{th}$ energy level is $p_i$, and the entropy of the system is $$S = -k_B \sum_{i=1}^{n}$$

$p_i \ln p_i$, where $k_B$ is a Boltzmann constant, and this formula is called a Gibbs entropy formula.

16. Renyi thermalized state: a mixed state ρ corresponding to a minimized free energy loss function with a Renyi entropy:

$$F_\alpha(\rho) = Tr(H\rho) - \frac{1}{\beta_\alpha}\left(\frac{1}{1-\alpha} \ln TR\rho^\alpha\right);$$

where the second term $$-\frac{1}{\beta_\alpha}\left(\frac{1}{1-\alpha} \ln Tr\rho^\alpha\right)$$

is the Renyi entropy multiplied by a temperature factor. α is an order of the Renyi's entropy (a positive integer greater than or equal to 2). The present subject matter only concerns the case of α=2, also similar in other cases. However, since the circuit measurement of a high-order Renyi entropy requires more resources, α=2 may be used in general practical applications. It is worth noting that $1/\beta_\alpha$ should be understood here as a Lagrange factor with no physical meaning, which does not necessarily correspond to the reciprocal of a temperature. When $\beta_\alpha$ is adjusted such that Gibbs thermalized states are the same in a case that the energy and temperature corresponding to the optimal ρ are β, the reciprocal of the temperature of the Renyi thermalized state is β. Numerical experiments show $\beta_\alpha=\beta$ in a larger temperature range. For the Renyi thermalized state of α=2, the corresponding probability distribution thereof on the energy eigenbasis is:

$$p_i \propto 1 - \frac{\beta_2}{2}(E_i - \overline{E}),$$

where $\overline{E}$ is a constant value that minimizes the Renyi free energy of the corresponding thermalized state.

17. Fidelity: the fidelity between two mixed states $\rho_0$ and ρ is defined as:

$$\left(Tr\left(\sqrt{\sqrt{\rho_0}\,\rho\sqrt{\rho_0}}\,\right)\right)^2.$$

The fidelity between two identical mixed states is 1.

18. Trace distance: a trace distance T between two mixed states ρ, σ is defined as:

$$T(\rho, \sigma) := \frac{1}{2}\|\rho - \sigma\|_1 = \frac{1}{2}Tr\left[\sqrt{(\rho-\sigma)^\dagger(\rho-\sigma)}\,\right].$$

The trace distance between two identical mixed states is 0.

19. Finite temperature system: a system with a temperature greater than 0, as opposed to a zero-temperature system corresponding to a ground state under study. An equilibrium state in the finite temperature system is not the ground state, but the mixed state represented by the Gibbs thermalized state.

20. Free energy: referring to a part of reduced internal energy in the system that can be converted into external work in a certain thermodynamic process, which measures: "useful energy" that can be outputted by the system to the outside in a particular thermodynamic process. The free energy may be divided into Helmholtz free energy and Gibbs free energy.

The technical scheme provided in the present subject matter helps to accelerating and enhancing the development and practicality of quantum hardware in the NISQ era. An enhanced scheme which is selected after variation of the neural network proposed in the present subject matter fully considers the characteristics of quantum hardware in the NISQ era, and therefore can enhance the expression ability of a shallow quantum circuit through a classical neural network part. In addition, this scheme is perfectly compatible with other processing scheme after NIS Q variation, such as a variational quantum neural network hybrid eigensolver (VQNHE) (the neural network in the scheme of the present subject matter acts on the auxiliary qubits, and the neural network of the VQNHE scheme acts on the system qubits), which can be used in conjunction to further improve the preparation of mixed states. That is, an effect of finite temperature VQE can be achieved. This scheme lays the foundation for demonstrating effective quantum advantages on NISQ hardware and accelerates the possibility of commercial application of quantum computers.

The schemes of the present subject matter may be easily applied to quantum hardware evaluation and testing, scientific research and actual production in the short and medium terms. These applications include, but are not limited to, the simulation of a finite temperature state of Hamiltonians from systems in quantum many-body physics and quantum chemistry problems.

The examples of the present subject matter provide a thermalized state preparation method under a quantum system, which may be implemented by a classical computer (for example, a personal computer (PC)), for example, by executing a corresponding computer program by a classical computer; or implemented by a quantum computer; or implemented in a hybrid device environment of a classical computer and a quantum computer, for example, in cooperation with the classical computer and the quantum computer. Exemplarily, the quantum computer is configured to implement the processing and measurement of a quantum state in an example of the present subject matter, and the classical computer is configured to implement other steps such as neural network computation, objective function computation, variational parameter optimization and the like in an example of the present subject matter.

For ease of description, in the following method example, the method is introduced and described by taking a computer device as an execution body for all the steps. The computer device may be a classical computer or a quantum computer, and may also include a hybrid execution environment of a classical computer and a quantum computer, which will not be limited in the examples of the present subject matter.

As shown in FIG. 1, the thermalized state preparation frame under a quantum system according to an example of the present subject matter includes: a parameterized quantum circuit (PQC) 10, a neural network 20, and an optimizer 30. The parameterized quantum circuit 10 is configured to perform a transformation process on an input quantum state of combined qubits to obtain a corresponding output quantum state. The combined qubits include auxiliary qubits and system qubits of a target quantum system. The output quantum state of the parameterized quantum circuit 10 is measured for n times to obtain n sets of measurement results, wherein each set of measurement results includes first measurement results corresponding to the system qubits, and second measurement results corresponding to the auxiliary qubits, n is a positive integer. The neural network 20 is configured to process the second measurement results to obtain weight parameters. A correlation function value of the mixed state of the target quantum system is computed based on the weight parameters and the first measurement results; and then, the expected value of the objective function is computed based on the correlation function value of the mixed state. The optimizer 30 is configured to adjust a parameter of a target object (for example, including a parameterized quantum circuit 10 and/or neural network 20) by taking an expected value convergence of the objective function as a goal. Under a condition that the expected value of the objective function satisfies a convergence condition, the mixed state of the target quantum system is acquired to approximately characterize the thermalized state of the target quantum system.

Figure 2:
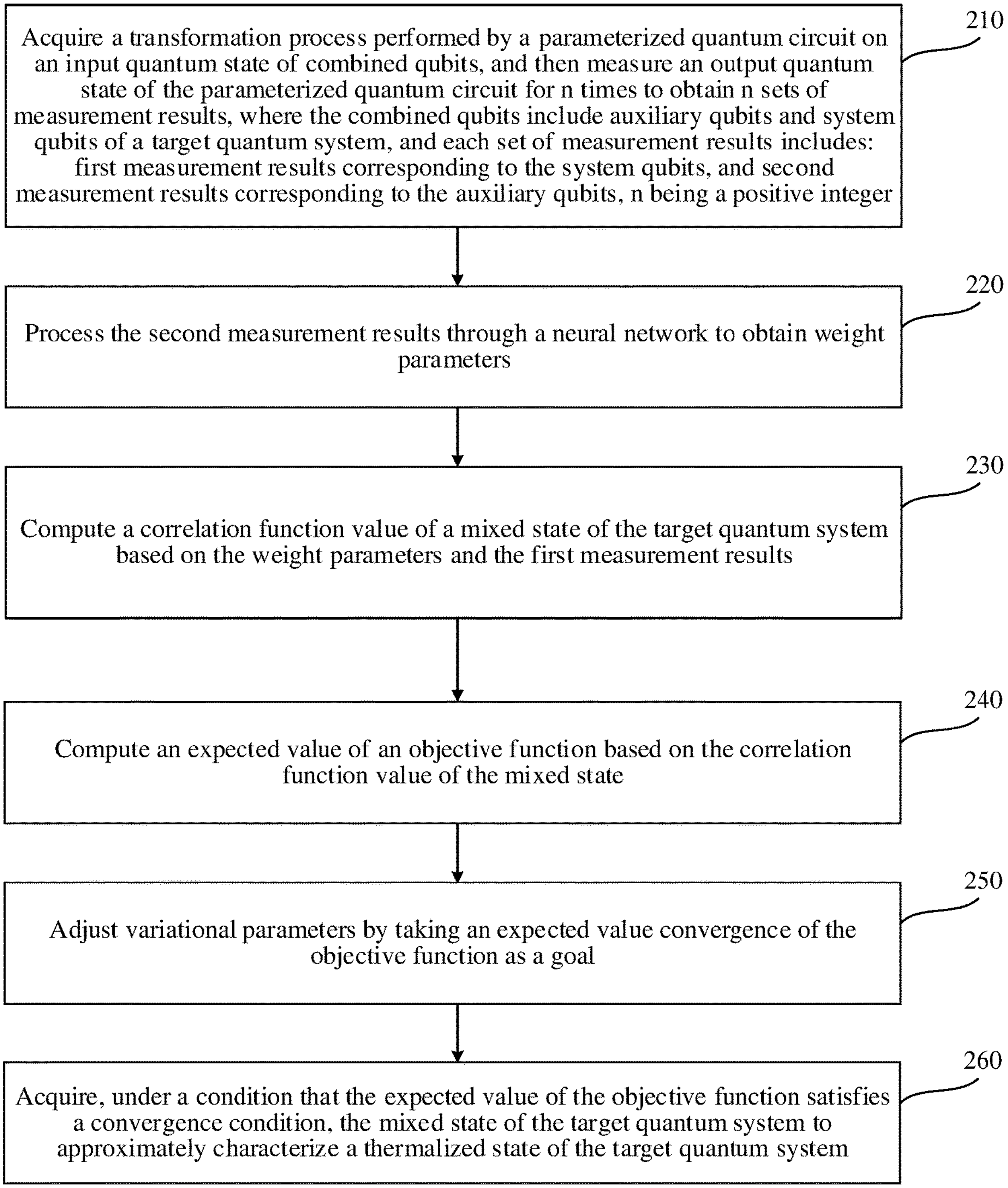
FIG. 2 is a flowchart of a thermalized state preparation method under a quantum system according to an example of the present subject matter.

FIG. 2 is a flowchart of a thermalized state preparation method under a quantum system according to an example of the present subject matter. This method may be applied to the framework shown in FIG. 1. For example, the execution body for all steps may be a computer device. The method may include the following several steps (210-260).

Step 210: Acquire a transformation process performed by a parameterized quantum circuit on an input quantum state of combined qubits, and then measuring an output quantum state of the parameterized quantum circuit for n times to obtain n sets of measurement results, wherein the combined qubits include auxiliary qubits and system qubits of a target quantum system, and each set of measurement results includes: first measurement results corresponding to the system qubits, and second measurement results corresponding to the auxiliary qubits, n is a positive integer.

The target quantum system may be any quantum system that needs to be studied. The thermalized state of the target quantum system under a finite temperature system can be approximately prepared by the technical scheme provided in the present example. For example, the target quantum system may be any quantum physical system or quantum chemical system. The obtained thermalized state of the target quantum system may be used to evaluate real properties of an actual material of the system at a finite temperature state, and may also be used to study behaviors of the system in a non-thermal equilibrium system. The system qubits refer to qubits contained in the target quantum system. If the target quantum system contains 5 qubits, the number of the system qubits is also 5. The auxiliary qubits are prepared for obtaining the mixed state of the target quantum system. The number of the auxiliary qubits is not limited in the present subject matter. For example, the number of the auxiliary qubits may be the same as the number of the system qubits, or may be less than or greater than the number of the system qubits. In principle, the larger the number of the auxiliary qubits, for example, the closer the number of the auxiliary qubits is to the number of the system qubits, the better the approximation effect of the finally prepared thermalized state. However, the increase in the number of the auxiliary qubits will also lead to the increase in the complexity of the entire processing process, so the appropriate number of auxiliary qubits may be selected with a combination of accuracy and complexity.

An input to the parameterized quantum circuit includes the input quantum state of combined qubits, that is, the input quantum state that includes system qubits and auxiliary qubits. The input quantum state may generally be either an all-zero state, a uniform superposition state, or a Hartree-Fock state, also known as a tentative state.

In an example of the present subject matter, the arrangement of the system qubits and the auxiliary qubits is not limited. For example, the system qubits and the auxiliary qubits may be arranged in an overlapping manner. For example, the system qubits and the auxiliary qubits may be arranged one by one at intervals, or arranged by inserting one auxiliary qubit to every several system qubits, and so on. The overlapping arrangement can maximize entanglement between the system qubits and the auxiliary qubits, so that parameterized quantum circuit can use shallower circuit depths and reduce the complexity.

The parameterized quantum circuit may perform a transformation process on the input quantum state of combined qubits to output a corresponding output quantum state. By measuring the output quantum state corresponding to the system qubits, the first measurement results can be obtained. By measuring the output quantum state corresponding to the auxiliary qubits, the second measurement results can be obtained. The first measurement results may be a bit string, referred to in the present subject matter as a first bit string. The first bit string in FIG. 1 is expressed as s'. The second measurement results may be a bit string, referred to in the present subject matter as a second bit string. The second bit string in FIG. 1 is expressed as s. By measuring the output quantum state of the parameterized quantum circuit for multiple times, each measurement may obtain one set of measurement results, and finally multiple sets of measurement results are obtained. Any two measurement results may or may not be the same.

In an example of the present subject matter, a transformation process may be performed by the parameterized quantum circuit on the input quantum state of combined qubits, and then the output quantum state of the parameterized quantum circuit is measured for n times to obtain n sets of measurement results. The computer device acquires the n-set measurement results above and performs the next steps described below. The output quantum state of the parameterized quantum circuit is measured by a measurement circuit for n times to obtain n sets of measurement results. In the examples of the present subject matter, the specific structure of the measurement circuit is not limited, which may be any circuit that can perform the measurement of the output quantum state of the parameterized quantum circuit.

Step 220: Process the second measurement result through a neural network to obtain weight parameters.

In an example of the present subject matter, the neural network is used to process the second measurement results corresponding to the auxiliary qubits (for example, a second bit string), wherein an output result of the neural network is referred to as the weight parameter. The second measurement results are inputted into the neural network, and the weight parameters are calculated by the neural network. In the examples of the present subject matter, the structure of the neural network is not limited, which may be a simple fully connected structure or other more complex structures, and may not be limited in the present subject matter.

Step 230: Compute a correlation function value of the mixed state of the target quantum system based on the weight parameters and the first measurement results.

Optionally, based on the weight parameters corresponding to n second measurement results respectively, operation results corresponding to n first measurement results are subjected to weighted averaging to obtain the correlation function value of the mixed state of the target quantum system. Since the first measurement results and the second measurement results are in one-to-one mapping, for the first measurement results and the second measurement results belonging to the same set of measurement results, the weight parameter obtained based on the second measurement results is multiplied by an operation result corresponding to the first measurement results of the same set to obtain a product result. In this way, n sets of measurement results can obtain n product results, which are then summed to obtain a weighted summation result, and then the correlation function value of the mixed state of the target quantum system is computed based on the weighted summation result. For example, the weighted summation result is divided by a sum of the weight parameters corresponding to n second measurement results to obtain the correlation function value of the mixed state of the target quantum system.

Optionally, an objective correlation function is used to operate and process n first measurement results respectively to obtain the operation results corresponding to the n first measurement results. The objective correlation function is used to acquire the correlation function value of the mixed state of the target quantum system.

Step 240: Compute an expected value of an objective function based on the correlation function value of the mixed state.

The objective function is used to optimize variational parameters. Optionally, the expected value of the objective function is free energy of the mixed state which is calculated based on the correlation function value of the mixed state.

Step 250: Adjust the variational parameters by taking an expected value convergence of the objective function as a goal, wherein the variational parameters include at least one of the following: parameters of the parameterized quantum circuit, or parameters of the neural network.

The variational parameters are adjusted in an optimized manner by taking the expected value convergence of the objective function as an optimization goal, optionally by taking a minimum of the expected value convergence of the objective function as a goal. Of course, in some other possible examples, it may also be possible to adjust the variational parameters in an optimized manner by taking a maximum of the expected value convergence of the objective function as a goal. A convergence direction of the expected value of the objective function is not limited in the present subject matter.

Optionally, the variational parameters include parameters for the parameterized quantum circuit and parameters of the neural network. That is, the parameters of both the parameterized quantum circuit and the parameters of the neural network are both optimized. Taking the expected value convergence of the objective function as the goal, the parameters of the parameterized quantum circuit and the parameters of the neural network are adjusted. After such rounds of iterative optimization, the expected value of the objective function satisfies the convergence condition. In addition, the parameters of the parameterized quantum circuit and the parameters of the neural network can be adjusted synchronously, or can be adjusted sequentially, that is, one set of parameters is fixed while the other set of parameters is adjusted, which will not be limited in the present subject matter.

Further, in some other possible examples, it is also necessary to adjust only the parameters of the parameterized quantum circuit, rather than the parameters of the neural network; or only the parameters of the neural network, rather than the parameters of the parameterized quantum circuit, which will not be limited in the present subject matter.

Step 260: Under a condition that the expected value of the objective function satisfies the convergence condition, the mixed state of the target quantum system is acquired to approximately characterize the thermalized state of the target quantum system.

Under a condition that the expected value of the objective function satisfies the convergence condition, the mixed state of the target quantum system is prepared by the above method to approximately characterize the thermalized state of the target quantum system.

Specifically, under the condition that the expected value of the objective function satisfies the convergence condition, multiple sets of output quantum states corresponding to the system qubits outputted by the parameterized quantum circuit and multiple sets of weight parameters corresponding to the auxiliary qubits outputted by the neural network are acquired. The weight parameters are regarded as probability values, and the multiple sets of weight parameters are in one-to-one mapping with the multiple sets of output quantum states to obtain the mixed state of the target quantum system. At this time, the obtained mixed state is used to approximately characterize the thermalized state of the target quantum system.

According to the technical scheme provided by the present subject matter, in the process of preparing the thermalized state of the target quantum system, a scheme of neural network post-processing is introduced. In this scheme, the parameterized quantum circuit processes the input quantum state of the system qubits and the auxiliary qubits, and then processes the measurement results corresponding to the auxiliary qubits through the neural network to obtain the corresponding weight parameters. The weight parameters are used to approximately characterize a probability in the mixed state, and then the expected value of the objective function is computed based on the correlation function of the constructed mixed state. Taking the expected convergence of the objective function as the goal, the parameters of the parameterized quantum circuit and the parameters of the neural network are optimized, so that the mixed state of the target quantum system is acquired, under the condition that the expected value of the objective function satisfies the convergence condition, to approximately characterize the thermalized state of the target quantum system. In this scheme, by introducing the weight parameters outputted by the neural network, the weight parameters are used to adjust weights corresponding to different auxiliary qubit measurement results, so as to enhance the expression ability of the overall circuit through trainable parameters of the neural network, thereby achieving an effect of preparing the thermalized state more efficiently and accurately.

Figure 3:
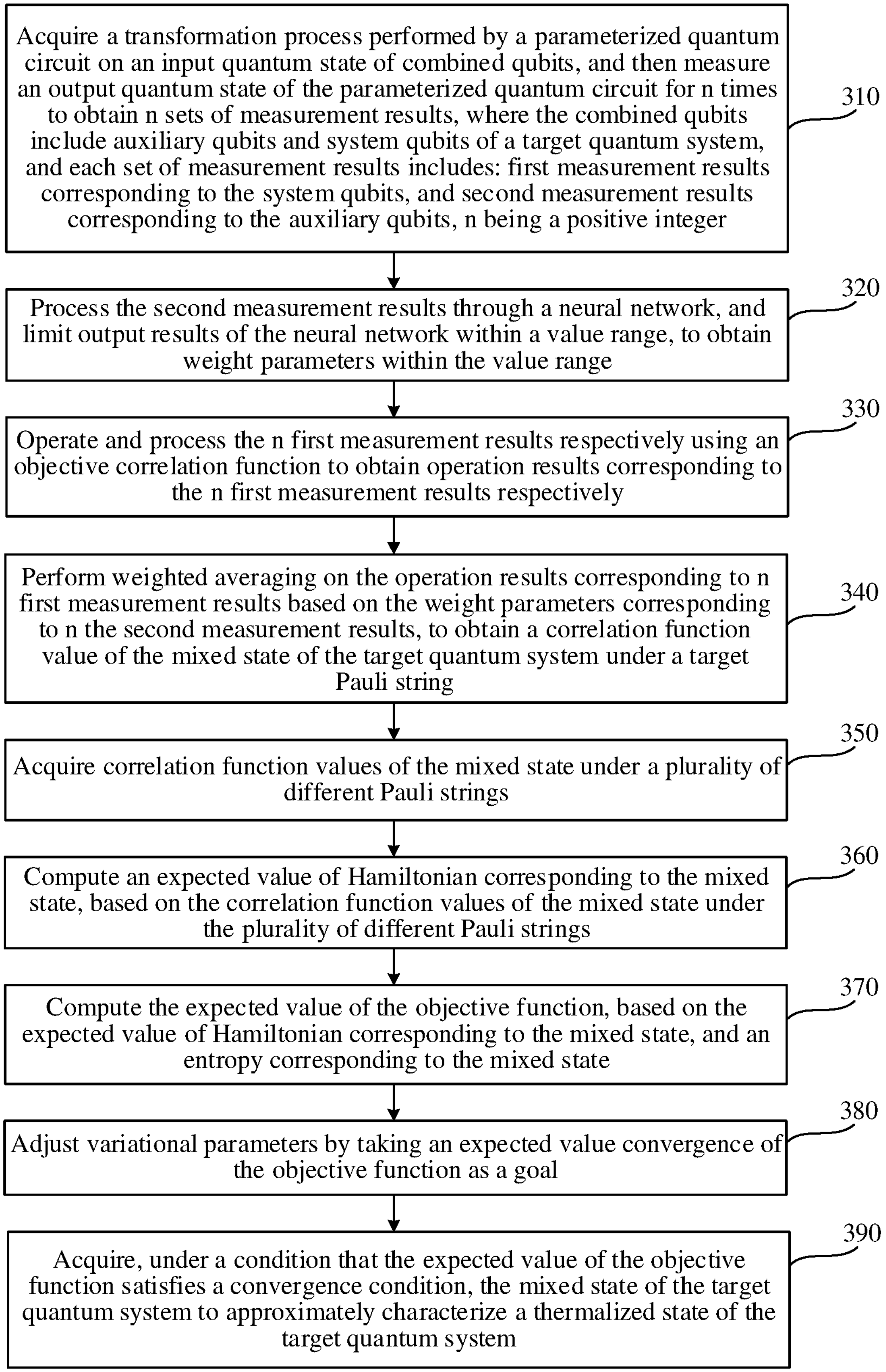
FIG. 3 is a flowchart of a thermalized state preparation method under a quantum system according to another example of the present subject matter.

FIG. 3 is a flowchart of a thermalized state preparation method under a quantum system according to another example of the present subject matter. This method may be applied to the framework shown in FIG. 1. For example, an execution body for all steps may be a computer device. This method may include the following steps (310 to 390).

Step 310: Acquire a transformation process performed by a parameterized quantum circuit on an input quantum state of combined qubits, and then measure an output quantum state of the parameterized quantum circuit for n times to obtain n sets of measurement results, wherein the combined qubits include auxiliary qubits and system qubits of a target quantum system, and each set of measurement results includes: first measurement results corresponding to the system qubits, and second measurement results corresponding to the auxiliary qubits, n is a positive integer.

Optionally, the system qubits and the auxiliary qubits are arranged in an overlapped manner. Since the parameterized quantum circuit requires a certain entanglement, and the greater the entanglement created by a single layer, the fewer route layers are required. The system qubits and the auxiliary qubits are arranged in an overlapped manner. By means of the above arrangement, the entanglement of the system qubits and the auxiliary qubits is maximum, and a route depth required by the parameterized quantum circuit is shallower.

Step 320: Process the second measurement results through the neural network, and limit the output results of the neural network within a value range to obtain the weight parameters within the value range.

Considering that the fluctuation of the weight parameters outputted by the neural network may be too large after inputting different second measurement results to the neural network, a relative error of the estimation may be difficult to control. The reason resides in that the probability in the mixed state approximately characterized by the weight parameters is seriously mismatched with the probability of measuring the output quantum state corresponding to the auxiliary qubits to obtain the second measurement result, which is equivalent to the inconsistency between the importance sampling distribution and the actual distribution, resulting in a relatively large error. Therefore, the value range of the output results of the neural network may be limited, so as to prevent the number of measurements required to estimate the correlation function value from diverging exponentially with the size of the system. This thermalized state preparation scheme that limits the value range of the output results of the neural network is regarded as a thermalized state preparation scheme for post-processing of a bounded neural network.

Optionally, the above value range is set to [1/r, r], r is a value greater than 1. In a case that the value range set to [1/r, r] can be mathematically strictly controlled to achieve the specified accuracy, the number of measurements required for thermalized state preparation using the scheme of the present subject matter is greater than the number of measurements required for eigenstate estimation using the ordinary VQE framework by polynomial times of r. The larger the value of r, the better the expression ability of the thermalized state preparation framework, but the greater the error. Therefore, in order to ensure a certain expression ability without an excessive error, it is found experimentally that the value of r may be set to $e^e \approx 15$.

In addition, the way by which the value range is limited is not limited in the present subject matter. In a possible example, the output of the neural network may be directly limited, so that the value of the neural network will not beyond the value range, instead may be a value within the value range. In this way, the value outputted by the neural network may be directly used as a weight parameter. In another possible example, the output of the neural network may not be directly limited. The output of the neural network may be a value outside the value range. Then, the output of the neural network is mapped with a value to obtain a value within the value range as a final weight parameter.

Step 330: Use an objective correlation function to operate and process n first measurement results respectively to obtain the operation results corresponding to the n first measurement results.

The objective correlation function is used to acquire the correlation function value of the mixed state of the target quantum system under a target Pauli string.

Optionally, the first measurement results corresponding to the system qubits are computed from a plurality of different Pauli strings to obtain operation results corresponding to different Pauli strings. For example, by using different objective correlation functions and performing operations on the first measurement results separately, the correlation function values of the mixed state of the target quantum system under a plurality of different Pauli strings can be obtained. Then, based on the correlation function values of the mixed state under a plurality of different Pauli strings, an expected value of Hamiltonian corresponding to the mixed state is computed, and the expected value of the objective function is computed based on the expected value of Hamiltonian corresponding to the mixed state and an entropy corresponding to the mixed state. Optionally, the expected value of Hamiltonian corresponding to the mixed state is computed, based on a summation result of the correlation function values of the mixed state under a plurality of different Pauli strings. The objective function is constructed based on Hamiltonian and some other parameters. Therefore, the expected value of the objective function can be computed based on the expected value of Hamiltonian corresponding to the mixed state and the entropy corresponding to the mixed state. For the specific implementations of the objective function, see the following introduction.

Step 340: Perform weighted averaging on operation results corresponding to n first measurement results based on the weight parameters corresponding to n second measurement results, to obtain the correlation function value of the mixed state of the target quantum system under the target Pauli string.

Exemplarily, the correlation function value $C_n$ of the mixed state of the target quantum system under the target Pauli string is:

$$C_n = \frac{\sum_s w(s)C(s')}{\sum_s w(s)}$$

where w(s) represents a weight parameter corresponding to the second measurement result (for example, a second bit string), C(s') represents an operation result corresponding to the first measurement result (for example, a first bit string s'), and C( ) represents the objective correlation function.

Exemplarily, a computation formula of C(s') is described below:

$$C(s')=\prod_{1}^{m}(1-2s'_m)$$

where $s'_m$ represents a value of an $m^{th}$ bit in the first bit string s', $s'_m$=0 or 1, m represents a length of the first bit string s', that is, the number of bits in the first bit string s', and m is a positive integer.

For example, when the length of the first bit string s' is 2, assuming the first bit string $s'=s'_1s'_2=01$, then C(s')=(1−2*0)*(1−2*1)=−1.

Step 350: Acquire correlation function values of the mixed state under a plurality of different Pauli strings.

The correlation function values of the mixed state under the plurality of different Pauli strings are acquired by using different correlation functions.

In an example of the present subject matter, the output quantum state corresponding to the system qubits may be measured from a plurality of different Pauli strings, and the correlation function values of the mixed state under the plurality of different Pauli strings can be obtained based on measurement results of the different Pauli strings.

Step 360: Compute an expected value of Hamiltonian corresponding to the mixed state, based on the correlation function values of the mixed state under the plurality of different Pauli strings.

Optionally, the expected value of Hamiltonian corresponding to the mixed state is computed, based on a summation result of the correlation function values of the mixed state under the plurality of different Pauli strings.

Step 370: Compute an expected value of the objective function based on the expected value of Hamiltonian corresponding to the mixed state and the entropy corresponding to the mixed state.

The expected value of the objective function can be computed based on the expected value of Hamiltonian corresponding to the mixed state and the entropy corresponding to the mixed state. Optionally, the entropy corresponding to the above mixed state may be a Gibbs entropy or Renyi entropy corresponding to the mixed state. Optionally, the objective function may be expressed using a computational formula for the free energy corresponding to the mixed state. When the free energy corresponding to the mixed state of the target quantum system converges (such as taking a minimum value), the mixed state at this time can be regarded as a thermalized state of the target quantum system under a finite temperature system.

Optionally, in a case that a thermalized state in a first form of the target quantum system needs to be acquired, the objective function is free energy corresponding to a thermalized state in a second form. The thermalized state in the first form and the thermalized state in the second form are two thermalized states in different forms, and have a local approximation characteristic therebetween. The so-called local approximation characteristic means that under certain specific circumstances, the expectations for local observations given by the above two forms of thermalized states are similar.

In some examples, the thermalized state in the first form is a Gibbs thermalized state, and the thermalized state in the second form is a Renyi thermalized state. The Gibbs thermalized state and the Renyi thermalized state have the local approximation characteristic therebetween, and the mixed state with minimal Renyi free energy is consistent with a thermodynamic limit of the Gibbs thermalized state in terms of local correlation. Therefore, if the Gibbs thermalized state of the target quantum system needs to be obtained, the most direct way is to use the Gibbs free energy as the objective function. However, because the measurement and solution of a Gibbs entropy in the Gibbs free energy is too complicated when measured on a quantum computer, the Renyi free energy may be used as the objective function using the above local approximation characteristic. When measured on the quantum computer, the measurement and solution of the Renyi entropy in Renyi free energy is simpler and more efficient than that of the Gibbs entropy. The computational complexity of the Gibbs entropy and the Renyi entropy is not much different while performing numerical simulations on a classical computer.

Exemplarily, the Gibbs thermalized state of the target quantum system needs to be obtained, the Renyi free energy may be used as the objective function, in which case the objective function is:

$$F_\alpha(\rho)=Tr(H\rho)-\frac{1}{\beta_\alpha}\left(\frac{1}{1-\alpha}\ln Tr\rho^\alpha\right)$$

where H represents Hamiltonian corresponding to the mixed state, ρ represents a density matrix corresponding to the mixed state, β and α are temperature parameters, and Tr represents the solution of a trace of the matrix.

Optionally, the Gibbs thermalized state is approximately characterized by the Renyi thermalized states in a case of taking α=2 and $\beta_2=\beta$.

In addition, from the perspective of numerical experiments, if the Gibbs thermalized state of the target quantum system needs to be obtained, the Gibbs free energy may be used directly as the objective function, in which case the objective function is:

$$F_G(\rho)=Tr(H\rho)-\frac{1}{\beta}(-Tr(\rho\ln\rho))$$

where H represents Hamiltonian corresponding to the mixed state, ρ represents a density matrix corresponding to the mixed state, β is a temperature parameter, and Tr represents the solution of a trace of the matrix.

Step 380: Adjust the variational parameters by taking an expected value convergence of the objective function as a goal, wherein the variational parameters include at least one of the following: parameters of the parameterized quantum circuit, or parameters of the neural network.

Parameter optimization of the parameterized quantum circuit and the neural network may be implemented using gradient optimization or gradient-free optimization scheme, which is consistent with other variational quantum algorithms. The only thing to note is that an expectation for weighting the neural network here does not satisfy a condition for solving an analytical gradient by parameter translation, so a gradient of a parameter part of the quantum circuit can only be estimated in the form of finite difference.

Step 390: Under a condition that the expected value of the objective function satisfies the convergence condition, the mixed state of the target quantum system is acquired to approximately characterize the thermalized state of the target quantum system.

Under a condition that the expected value of the objective function satisfies the convergence condition, the mixed state of the target quantum system is prepared by the above method to approximately characterize the thermalized state of the target quantum system.

In this example, using the thermalized state preparation scheme using post-processing of a bounded neural network, the final weight parameter is limited within the above value range by limiting the output results of the neural network within the value range, which can avoid the problem that the relative error of estimation may be difficult to control due to excessive fluctuation of the weight parameters outputted by the neural network, thereby being helpful to further improve the accuracy of the final thermalized state.

In addition, the expected value of Hamiltonian corresponding to the mixed state is further computed based on the correlation function values of the mixed state under a plurality of different Pauli strings, and the expected value of the objective function is then computed based on the expected value of Hamiltonian corresponding to the mixed state and the entropy corresponding to the mixed state. Therefore, the solution of the objective function comprehensively considers the information of the mixed state under the plurality of different Pauli strings, which improves the accuracy of the objective function and also helps to further improve the accuracy of the final thermalized state.

In addition, by using the local approximation characteristic of the Gibbs thermalized state and the Renyi thermalized state, the Renyi free energy may be used as the objective function in a case that the Gibbs thermalized state of the target quantum system needs to be obtained, which can simplify the computational complexity and improve the efficiency compared to a mode of directly using the Gibbs free energy as the objective function. Taking advantage of the Renyi entropy, especially a low-order Renyi entropy being easier to measure on the circuit, an efficient approximation of the thermalized state under polynomial resources can be successfully achieved. For example, in order to take a Renyi entropy of a Renyi2 order of $\alpha=2$, it is necessary to reduce resources and the number of measurements significantly.

Among the related technologies, another scheme (referred to as Scheme II) for preparing a Gibbs thermalized state is also provided: a specific architecture is adopted so that a Gibbs entropy may be reduced to the computation of a classical probabilistic model. This scheme will first generate a bit string having the same degrees of freedom as system qubits through a classical neural network probability model. A corresponding classical probability is p(i), where p(i) represents a probability that the measured bit string is i. Then, a quantum direct product state $|i\rangle$ corresponding to the bit string i is inputted to a parameterized quantum circuit V that only acts on the system qubits, so as to construct a corresponding mixed state. Mathematically, a density matrix $\rho$ corresponding to this mixed state is:

$$\rho = \sum_i p(i) V |i_s\rangle\langle i_s| V^\dagger$$

where $|i_S\rangle$ represents a bit string on the system qubit s.

At this time, due to orthogonality between the different output states $V|i_S\rangle$, the Gibbs entropy corresponding to the mixed state is reduced to a classical Gibbs entropy:

$$S = \sum_i p_i \ln p_i$$

where $p_1$ has the same meaning as p(i) in the above formula.

As a result, the Gibbs entropy can be computed efficiently without the need for additional measurements.

However, this scheme has a large gap compared with the method of the present subject matter in terms of the accuracy of approximating the thermalized state.

A quantum circuit+neural network post-processing method provided in the present subject matter will be introduced below, which is superior in terms of expression ability compared with a neural network feedforward+quantum circuit method provided by the above related technologies.

Based on numerical simulation results of optimizing free energy with an entropy, in the case of analogy, the technical scheme of the present subject matter may be closer to a strict thermalized state and therefore has better expression ability.

Using a transverse field Ising model (TFIM) with a periodic boundary condition having N=8 lattice points as a test system, Hamiltonian of the TFIM may be expressed as:

$$H = \sum_{i=1}^{N} Z_i Z_{i+1} - \sum_{i=1}^{N} X_i$$

where Z represents a Pauli Z operator, X represents a Pauli X operator, n is a positive integer, and i is a positive integer less than or equal to n.

This system has a free energy of −11.35678 for a corresponding thermal equilibrium state at a temperature of $\beta=1$.

The structure of the parameterized quantum circuit selected is:

$$U = \prod_{p=1}^{P}\left(\prod_{i=1}^{N-1} e^{i\theta_{pi1} Z_i Z_{i+1}} e^{i\theta_{pi2} X_i}\right)\prod_{i=1}^{N} H_i$$

where P is a number of repeating structures $$\prod_{i=1}^{N-1} e^{i\theta_{pi1} Z_i Z_{i+1}} e^{i\theta_{pi2} X_i},$$

and $H_i$ is a Hadamard gate acting on an $i^{th}$ qubit, with a matrix represented as $$H = \frac{1}{\sqrt{2}}\begin{pmatrix} 1 & 1 \\ 1 & -1 \end{pmatrix}.$$

Qubits and system qubits are arranged in an overlapped manner because this arrangement can maximize the entanglement of a physical system and an auxiliary system, such that parts of the physical system can be thermalized with a shallower circuit depth. Since the circuit always requires a certain entanglement, the greater the entanglement created by a single layer, the fewer circuit layers are required. Therefore, our scheme requires a system of 2N=16 bits. The corresponding circuit of Scheme II adopts the same structure, occupying only 8 bits of the physical system. That is, our scheme uses twice as many qubits as Scheme II. Therefore, in order to have a comparable number of quantum gates, we should compare the expressive abilities of the existing scheme and Scheme II at least twice as deep. In fact, a more complex [ZZ, Rx, Ry]*P variational circuit structure is applied to the architecture of the previous scheme. However, our scheme only takes the more conservative [ZZ, Rx]*P circuit structure. Since the expression abilities of circuits in the two schemes are compared here, the free energy with the Gibbs entropy is used as an optimized objective function in both the two schemes in terms of numerical values. The results show that the thermalized state preparation of our scheme still has stronger expression ability even without considering the more severe influence of noise on deeper circuit decoherence.

At P=8, our scheme optimizes the mixed state to obtain a free energy of −11.347, and the fidelity of the strict Gibbs thermalized state reaches 0.997. Conversely, for Scheme II, the same circuit with a similar number of quantum gates of P=16 is proposed, and the free energy obtained after optimization is −11.301, which is inferior to our scheme; and the corresponding fidelity is only 0.976, which is also worse than our scheme. More specifically, Table 1 shows performances of the two schemes under the optimization of the free energy with a Gibbs entropy. It can be seen that a good approximation effect (even better than Scheme II, which is more complex in the circuit proposal and has a layer number of 2P=16) can be maintained in a neural network post-processing architecture even if there is only a variational circuit with P=2.

TABLE 1

| Circuit depth P | | 2 | 4 | 8 |
|---|---|---|---|---|
| Scheme 2: Neural network feedforward + Quantum circuit (2P) | Fidelity | 0.823 | 0.926 | 0.976 |
| | Trace distance | 0.389 | 0.197 | 0.0977 |
| | Free energy | −10.834 | −11.183 | −11.301 |
| Scheme in the present subject matter Quantum circuit + Neural network post-processing (P) | Fidelity | 0.996 | 0.997 | 0.997 |
| | Trace distance | 0.058 | 0.051 | 0.051 |
| | Free energy | −11.343 | −11.347 | −11.347 |

It can be shown that the expression ability of the mixed state prepared by the quantum circuit+neural network post-processing scheme (that is, the scheme of the present subject matter) is far better than that of the neural network feedforward+quantum circuit scheme (that is, Scheme II) in a case of similar quantum resources. Therefore, although Scheme II can efficiently compute the Gibbs entropy, it still needs to be optimized and approximated using the above architecture, which can make more efficient use of limited quantum hardware resources.

Next, the effects of different schemes in preparing a thermalized state are described and compared by numerical simulation to illustrate the advantages of the scheme of the present subject matter. Experiments are still performed on the TFIM of N=8 in the above example.

Figure 4:
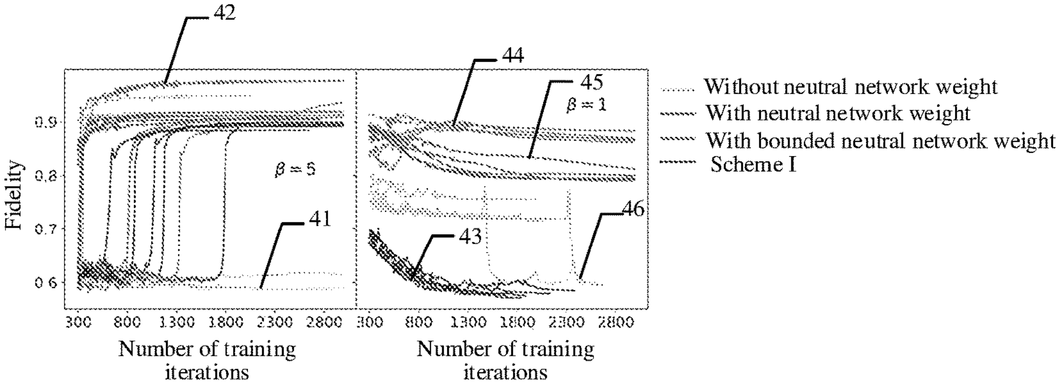
FIG. 4 is a schematic diagram of experimental results according to an example of the present subject matter.

FIG. 4 shows the fidelity of Gibbs thermalized states of various schemes for each training iteration (that is, parameter update iteration). The figure on the left shows the fidelity of each measurement at β=5, and it is obvious that a curve 41 without a neural network weight has the worse fidelity, while a curve 42 with a bounded neural network weight has the highest fidelity. The figure on the right shows the fidelity of each measurement in a high temperature area at β=1, where in the high temperature area, a curve 43 in Scheme I performs the worst, even below 0.6 at minimum, while a curve 44 with a bounded neural network weight performs the best. The following are a curve 45 with a neural network weight and a curve 46 without a neural network weight.

However, in either scheme, as the number of training iterations increases in the high temperature area, the fidelity of the thermalized state decreases, which is due to an overfitting problem that can be alleviated by increasing the size of the system.

Figure 5:
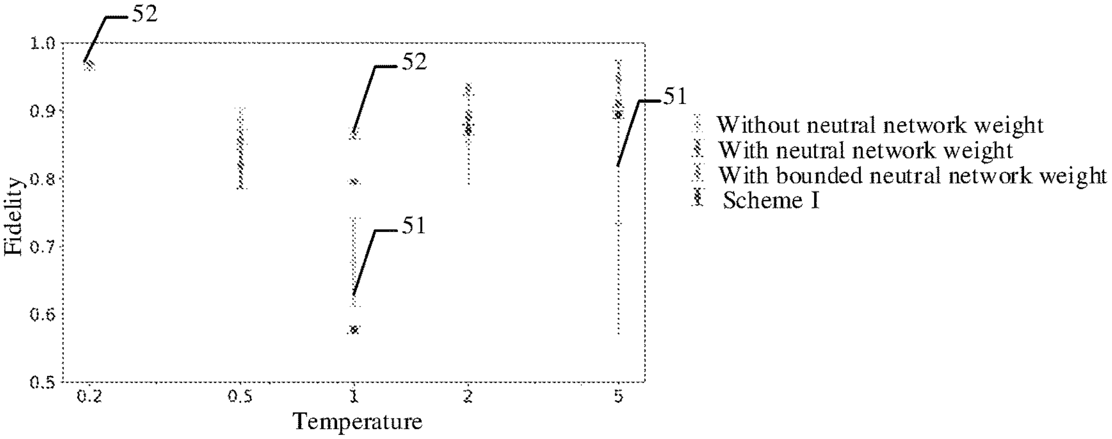
FIG. 5 is a schematic diagram of experimental results according to another example of the present subject matter.

FIG. 5 shows converged Gibbs free energy fidelity obtained at different temperatures, different schemes, and different numbers of independent optimizations. It can be seen that the results without neural network post-processing fluctuate greatly, accompanied with very unstable training. An interval 51 without a neural network weight is shown in FIG. 5. In contrast, the presence of a bounded neural network weight is a stable optimal scheme in which results fluctuate less while keeping high fidelity. An interval 52 with a bounded neural network weight is shown in FIG. 5.

Figure 6:
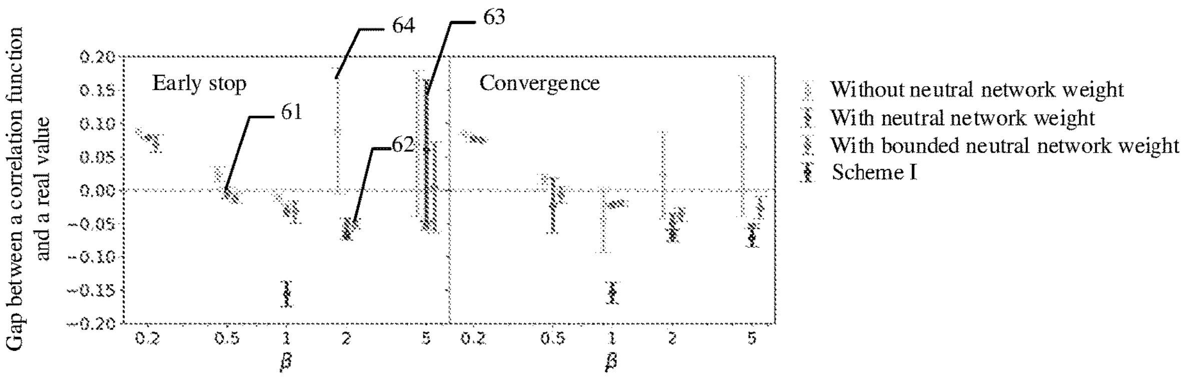
FIG. 6 is a schematic diagram of experimental results according to another example of the present subject matter.

FIG. 6 shows correlation function estimations given by different schemes for the same correlation function. The left figure is a gap between a correlation function and a true value after early stop (1000 rounds of optimizations), and the right figure is a gap between a correlation function and a true value after convergence. For a scheme with a neural network weight, the estimation difference between the correlation functions corresponding to early stop and final convergence is not large, like an interval 61 with a neural network weight and an interval 62 with a bounded neural network weight as shown in FIG. 6. Because the optimization of a free energy of a Renyi thermalized state in the later training period is caused by overfitting a goal of the Gibbs thermalized state, the correlation function estimation cannot be significantly improved. For an interval 63 in Scheme I, the estimations of the correlation functions corresponding to early stop and final convergence are very different, wherein a part with a deviation of more than 0.2 is not shown in the figure. The scheme without a neural network weight has large fluctuations in training variance, and larger expected estimation deviation in most cases, and an interval 64 without a neural network weight is shown in the figure. Since the fact that the Renyi thermalized state and the Gibbs thermalized state are in consistent in a local correlation in terms of a thermodynamic limit is true, the estimation of the correlation function is expected to become more accurate than the numerical results here as simulated systems (that is, the number of qubits) increase.

As shown in FIGS. 4 to 6, circuits with different gray-scales correspond to different schemes.

The following describes apparatus examples of the present subject matter, which can be used for performing the method examples of the present subject matter. For details not disclosed in the apparatus examples of the present subject matter, refer to the method examples of the present subject matter.

Figure 7:
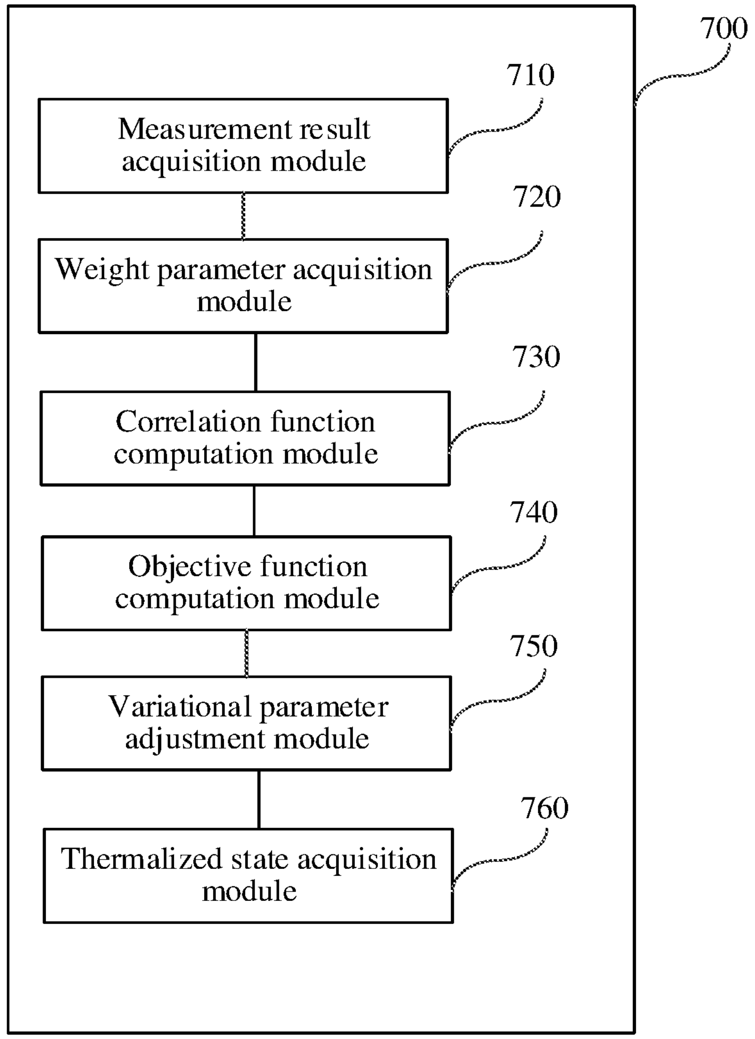
FIG. 7 is a block diagram of a thermalized state preparation apparatus under a quantum system according to an example of the present subject matter.

FIG. 7 is a block diagram of a thermalized state preparation apparatus under a quantum system according to an example of the present subject matter. The apparatus has a function of implementing the thermalized state preparation method under the quantum system, wherein the function may be implemented by hardware or may be implemented by hardware executing corresponding software. The apparatus may be a computer device, or may be provided in computer device. The apparatus 700 may include: a measurement result acquisition module 710, a weight parameter acquisition module 720, a correlation function computation module 730, an objective function computation module 740, a variational parameter adjustment module 750 and a thermalized state acquisition module 760.

The measurement result acquisition module 710 is configured to acquire a transformation process performed by a parameterized quantum circuit on an input quantum state of combined qubits, and then measure an output quantum state of the parameterized quantum circuit for n times to obtain n sets of measurement results, wherein the combined qubits include auxiliary qubits and system qubits of a target quantum system, and each set of measurement results includes: first measurement results corresponding to the system qubits, and second measurement results corresponding to the auxiliary qubits, n is a positive integer.

The weight parameter acquisition module 720 is configured to process the second measurement results through a neural network to obtain weight parameters.

The correlation function computation module 730 is configured to compute a correlation function value of a mixed state of the target quantum system based on the weight parameters and the first measurement results.

The objective function computation module 740 is configured to compute an expected value of an objective function based on the correlation function value of the mixed state.

The variational parameter adjustment module 750 is configured to adjust variational parameters by taking an expected value convergence of the objective function as a goal, wherein the variational parameters include at least one of the following: parameters of the parameterized quantum circuit, or parameters of the neural network.

The thermalized state acquisition module 760 is configured to acquire, under a condition that the expected value of the objective function satisfies a convergence condition, the mixed state of the target quantum system to approximately characterize a thermalized state of the target quantum system.

In some examples, the correlation function computation module 730 is configured to perform weighted averaging on operation results corresponding to n first measurement results based on the weight parameters corresponding to n second measurement results, to obtain a correlation function value of the mixed state of the target quantum system.

In some examples, the correlation function computation module 730 is configured to operate and process the n first measurement results respectively using an objective correlation function, to obtain the operation results corresponding to the n first measurement results. The objective correlation function is used to acquire a correlation function value of the mixed state of the target quantum system under a target Pauli string.

In some examples, the objective function computation module 740 is configured to acquire correlation function values of the mixed state under a plurality of different Pauli strings. The correlation function values of the mixed state under the plurality of different Pauli strings are acquired by using different correlation functions. An expected value of Hamiltonian corresponding to the mixed state is computed, based on the correlation function values of the mixed state under the plurality of different Pauli strings. The expected value of the objective function can be computed based on the expected value of Hamiltonian corresponding to the mixed state, and an entropy corresponding to the mixed state.

In some examples, in a case that a thermalized state in a first form of the target quantum system needs to be acquired, the objective function is free energy corresponding to a thermalized state in a second form. The thermalized state in the first form and the thermalized state in the second form are two thermalized states in different forms, and have a local approximation characteristic therebetween.

In some examples, the thermalized state in the first form is a Gibbs thermalized state, and the thermalized state in the second form is a Renyi thermalized state.

In some examples, the weight parameter acquisition module 720 is configured to process the second measurement results through the neural network, and the output results of the neural network are limited within a value range to obtain weight parameters within the value range.

In some examples, the value range is [1/r, r], where r is a value greater than 1.

In some examples, the system qubits and the auxiliary qubits are arranged in an overlapped manner.

According to the technical scheme provided by the present subject matter, in the process of preparing the thermalized state of the target quantum system, a scheme of neural network post-processing is introduced. In this scheme, the parameterized quantum circuit processes the input quantum state of the system qubits and the auxiliary qubits, and then processes the measurement results corresponding to the auxiliary qubits through the neural network to obtain the corresponding weight parameters. The weight parameters are used to approximately characterize a probability in the mixed state, and then the expected value of the objective function is computed based on the correlation function of the constructed mixed state. Taking the expected convergence of the objective function as the goal, the parameters of the parameterized quantum circuit and the parameters of the neural network are optimized, so that the mixed state of the target quantum system is acquired, under the condition that the expected value of the objective function satisfies the convergence condition, to approximately characterize the thermalized state of the target quantum system. In this scheme, by introducing the weight parameters outputted by the neural network, the weight parameters are used to adjust weights corresponding to different auxiliary qubit measurement results, so as to enhance the expression ability of the overall circuit through trainable parameters of the neural network, thereby achieving an effect of preparing the thermalized state more efficiently and accurately.

When the apparatus provided in the foregoing example implements the functions of the apparatus, only division of the foregoing function modules is used as an example for description. In the practical application, the functions may be allocated to and completed by different function modules according to requirements. That is, an internal structure of the device is divided into different function modules, to complete all or some of the functions described above. In addition, the apparatus provided in the foregoing examples and the method examples fall within the same conception. For details of a specific implementation process, refer to the method examples. Details are not described herein again.

The term module (and other similar terms such as unit, subunit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 8:
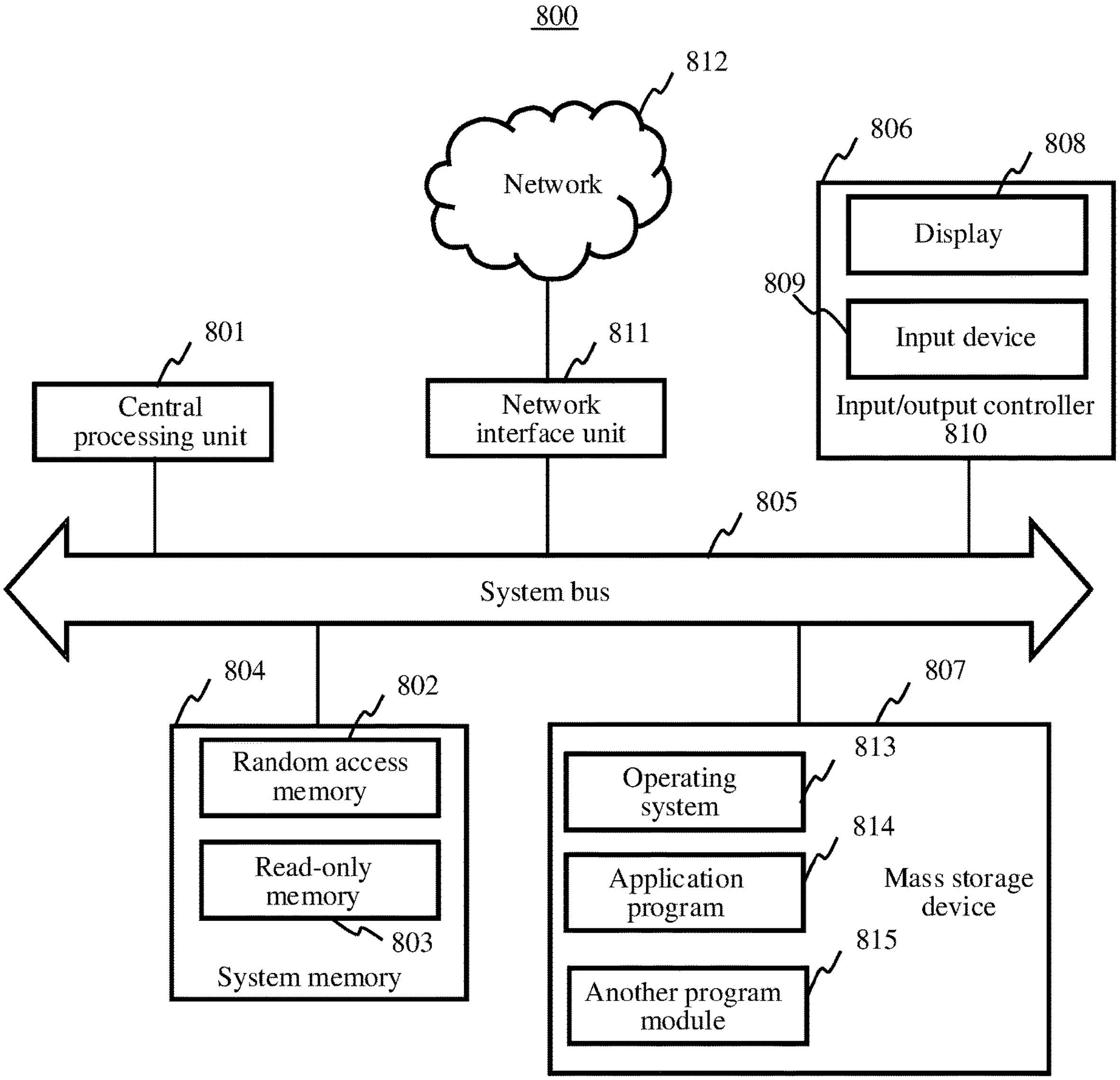
FIG. 8 is a structural diagram of a computer device according to an example of the present subject matter.

FIG. 8 is a schematic structural diagram of a computer device according to an example of the present subject matter. The computer device may be a classical computer. The computer device may be configured to implement the thermalized state preparation method under the quantum system provided in the above example.

Specifically, the computer device 800 includes a central processing unit (CPU), a graphics processing unit (GPU), a field programmable gate array (FPGA) 801, a system memory 804 including a random access memory (RAM) 802 and a read-only memory (ROM) 803, and a system bus 805 connecting the system memory 804 and the CPU 801. The computer device 800 further includes a basic input/output (I/O) system 806 assisting in transmitting information between components in a server, and a mass storage device 807 configured to store an operating system 813, an application program 814, and another program module 815.

Optionally, the basic I/O system 806 includes a display 808 configured to display information and an input device 809, such as a mouse or a keyboard, configured to input information for a user. The display 808 and the input device 809 are both connected to the CPU 801 by using an input/output controller 810 connected to the system bus 805. The basic I/O system 806 may further include the input/output controller 810 to be configured to receive and process inputs from a plurality of other devices such as a keyboard, a mouse, and an electronic stylus. Similarly, the input/output controller 810 further provides an output to a display screen, a printer or another type of output device.

Optionally, the mass storage device 807 is connected to the CPU 801 by using a large-capacity storage controller (not shown) connected to the system bus 805. The mass storage device 807 and a non-transitory computer-readable medium associated with the mass storage device provide non-volatile storage to the computer device 800. That is, the mass storage device 807 may include a computer-readable medium (not shown) such as a hard disk or a compact disc ROM (CD-ROM) drive.

Without loss of generality, the computer-readable medium may include a non-transitory computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, persons skilled in art can know that the computer storage medium is not limited to the foregoing several types. The system memory 804 and the mass storage device 807 may be collectively referred to as a memory.

According to the examples of the present subject matter, the computer device 800 may further be connected, through a network such as the Internet, to a remote computer on the network and run. That is, the computer device 800 may be connected to a network 812 by using a network interface unit 811 connected to the system bus 805, or may be connected to another type of network or a remote computer system (not shown) by using a network interface unit 816.

The memory further includes computer programs. The computer programs are stored in the memory and configured to be performed by one or more processors to implement the thermalized state preparation method under the quantum system.

In an example, a computer device is provided. The computer device is configured to implement the thermalized state preparation method under the quantum system. Optionally, the computer device is a quantum computer, or a classical computer, or a hybrid device execution environment of a quantum computer and a classical computer.

In an example, a non-transitory computer-readable storage medium is further provided. The storage medium has stored thereon a computer program which, when executed by a processor of a computer device, implements the thermalized state preparation method under the quantum system.

Optionally, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an example, a non-transitory computer program product is further provided. The computer program product includes a computer program which is stored in the computer-readable storage medium. A processor of a computer device may read a computer program from the computer-readable storage medium, and the processor performs the computer program, so that the computer device performs the thermalized state preparation method under the quantum system.

In an example, a thermalized state preparation system under a quantum system is further provided. The system includes: a parameterized quantum circuit and a computer device.

the parameterized quantum circuit is configured to perform a transformation process on an input quantum state of combined qubits to obtain an output quantum state of the parameterized quantum circuit, wherein the combined qubits include auxiliary qubits and system qubits of a target quantum system.

The computer device is configured to acquire and measure the output quantum state of the parameterized quantum circuit for n times to obtain n sets of measurement results, wherein each set of measurement results includes: first measurement results corresponding to the system qubits, and second measurement results corresponding to the auxiliary qubits, n is a positive integer.

The computer device is further configured to process the second measurement results through a neural network to obtain weight parameters; compute a correlation function value of a mixed state of the target quantum system based on the weight parameters and the first measurement results; and compute an expected value of an objective function based on the correlation function value of the mixed state.

The computer device is further configured to adjust variational parameters by taking an expected value convergence of the objective function as a goal; and acquire, under a condition that the expected value of the objective function satisfies a convergence condition, the mixed state of the target quantum system to approximately characterize the thermalized state of the target quantum system; the variational parameters include at least one of the following: parameters of the parameterized quantum circuit, or parameters of the neural network.

In some examples, the system further includes: a measurement circuit.

The measurement circuit is configured to measure the output quantum state of the parameterized quantum circuit for n times to obtain n sets of measurement results.

In some examples, the computer device is configured to perform weighted averaging on operation results corresponding to the n first measurement results based on the weight parameters corresponding to the n second measurement results respectively, to obtain the correlation function value of the mixed state of the target quantum system.

In some examples, the computer device is configured to operate and process the n first measurement results respectively using the objective correlation function to obtain the operation results corresponding to the n first measurement results. The objective correlation function is used to acquire a correlation function value of the mixed state of the target quantum system under a target Pauli string.

In some examples, the computer device is configured to acquire correlation function values of the mixed state under a plurality of different Pauli strings. The correlation function values of the mixed state under the plurality of different Pauli strings are acquired by using different correlation functions. An expected value of Hamiltonian corresponding to the mixed state is computed, based on the correlation function values of the mixed state under the plurality of different Pauli strings. The expected value of the objective function can be computed based on the expected value of Hamiltonian corresponding to the mixed state, and an entropy corresponding to the mixed state.

In some examples, in a case that a thermalized state in a first form of the target quantum system needs to be acquired, the objective function is free energy corresponding to a thermalized state in a second form. The thermalized state in the first form and the thermalized state in the second form are two thermalized states in different forms, and have a local approximation characteristic therebetween.

In some examples, the thermalized state in the first form is a Gibbs thermalized state, and the thermalized state in the second form is a Renyi thermalized state.

In some examples, the computer device is configured to process the second measurement results through the neural network, and the output results of the neural network are limited within a value range, to obtain the weight parameters within the value range.

In some examples, the value range is [1/r, r], where r is a value greater than 1.

In some examples, the system qubits and the auxiliary qubits are arranged in an overlapped manner.

The specific architecture of the thermalized state preparation system under the quantum system is not limited in the present subject matter, and may include a computer device, or may include a computer device and a parameterized quantum circuit, or may also include a computer device, a parameterized quantum circuit and a measurement circuit.

Further, details not detailed in the system example may refer to the above method example.

"A plurality of" mentioned in the Description means two or more. "And/or" describes an association relationship for describing associated objects and represents that three relationships may exist. For example, A/B may represent the following cases: only A exists, both A and B exist, and only B exists. The character "/" generally indicates an "or" relationship between the associated objects. In addition, the step numbers described in this specification merely exemplarily show a possible execution sequence of the steps. In some other examples, the steps may not be performed according to the number sequence. For example, two steps with different numbers may be performed simultaneously, or two steps with different numbers may be performed according to a sequence contrary to the sequence shown in the figure. This is not limited in the examples of the present subject matter.

The foregoing descriptions are merely examples of the present subject matter, but are not intended to limit the present subject matter. Any modification, equivalent replacement, or improvement made within the spirit and principle of the present subject matter shall fall within the protection scope of the present subject matter.

The invention claimed is:

1. A thermalized state preparation method under a quantum system performed by a computer device, comprising:

acquiring a transformation process performed by a parameterized quantum circuit on an input quantum state of combined qubits, and then measuring an output quantum state of the parameterized quantum circuit for n times to obtain n sets of measurement results, wherein the combined qubits include auxiliary qubits and system qubits of a target quantum system, each set of measurement results includes:

first measurement results corresponding to the system qubits, and second measurement results corresponding to the auxiliary qubits, wherein n is a positive integer and the first measurement results and the second measurement results are in a one-to-one mapping;

processing the second measurement results through a neural network to obtain weight parameters, wherein the weight parameters are used to characterize a probability in a mixed state of the target quantum system;

computing a correlation function value of the mixed state of the target quantum system based on the weight parameters and the first measurement results;

computing an expected value of an objective function based on the correlation function value of the mixed state;

adjusting variational parameters by taking an expected value convergence of the objective function as a goal, wherein the variational parameters comprise at least one of:

parameters of the parameterized quantum circuit, or parameters of the neural network; and acquiring, under a condition that the expected value of the objective function satisfies a convergence condition, the mixed state of the target quantum system to characterize a thermalized state of the target quantum system.

2. The method according to claim 1, wherein computing the correlation function value comprises:

performing weighted averaging on operation results corresponding to n first measurement results in the n sets of measurement results based on the weight parameters corresponding to n second measurement results in the n sets of measurement results to obtain the correlation function value of the mixed state of the target quantum system.

3. The method according to claim 2, further comprising:

operating and processing the n first measurement results respectively using an objective correlation function to obtain operation results corresponding to the n first measurement results respectively, wherein the objective correlation function is used for acquiring the correlation function value of the mixed state of the target quantum system under a target Pauli string.

4. The method according to claim 3, wherein the computing of the expected value comprises:

acquiring correlation function values of the mixed state under a plurality of different Pauli strings, wherein the correlation function values of the mixed state under the plurality of different Pauli strings are acquired by using different correlation functions;

computing an expected value of Hamiltonian corresponding to the mixed state based on the correlation function values of the mixed state under the plurality of different Pauli strings; and computing the expected value of the objective function based on the expected value of Hamiltonian corresponding to the mixed state and an entropy corresponding to the mixed state.

5. The method according to claim 1, wherein when a thermalized state in a first form of the target quantum system needs to be acquired, the objective function is free energy corresponding to a thermalized state in a second form, and the thermalized state in the first form and the thermalized state in the second form are two thermalized states in different forms and have a local approximation characteristic therebetween.

6. The method according to claim 5, wherein the thermalized state in the first form is a Gibbs thermalized state, and the thermalized state in the second form is a Renyi thermalized state.

7. The method according to claim 1, wherein the processing the second measurement results through the neural network comprises:

processing the second measurement results through the neural network, and limiting output results of the neural network within a value range to obtain weight parameters within the value range.

8. The method according to claim 7, wherein the value range is [1/r, r], and r is a value greater than 1.

9. The method according to claim 1, wherein the system qubits and the auxiliary qubits are arranged in an overlapped manner.

10. A computer device comprising a processor; and a memory storing instructions executable by the processor to configure the processor to implement the method according to claim 1.

11. A non-transitory computer-readable storage medium storing instructions executable by a processor to implement the method according to claim 1.

12. A computer program product comprising a computer program stored in a non-transitory computer-readable storage medium, wherein the computer program is executable by a processor to configure the processor to implement the method according to claim 1.

13. A thermalized state preparation apparatus under a quantum system, comprising a memory for storing instructions and a processor for executing the instructions to:

acquire a transformation process performed by a parameterized quantum circuit on an input quantum state of combined qubits, and then measure an output quantum state of the parameterized quantum circuit for n times to obtain n sets of measurement results, wherein the combined qubits include auxiliary qubits and system qubits of a target quantum system, and each set of measurement results includes:

first measurement results corresponding to the system qubits, and second measurement results corresponding to the auxiliary qubits, wherein n is a positive integer and the first measurement results and the second measurement results are in a one-to-one mapping;

process the second measurement results through a neural network to obtain weight parameters, wherein the weight parameters are used to characterize a probability in a mixed state of the target quantum system;

compute a correlation function value of the mixed state of the target quantum system based on the weight parameters and the first measurement results;

compute an expected value of an objective function based on the correlation function value of the mixed state;

adjust variational parameters by taking an expected value convergence of the objective function as a goal, wherein the variational parameters include at least one of:

parameters of the parameterized quantum circuit, or parameters of the neural network; and under a condition that the expected value of the objective function satisfies a convergence condition, the mixed state of the target quantum system to characterize a thermalized state of the target quantum system.

14. A thermalized state preparation system under a quantum system, comprising:

a parameterized quantum circuit; and a computer device, wherein the parameterized quantum circuit is configured to perform a transformation process on an input quantum state of combined qubits to obtain an output quantum state of the parameterized quantum circuit, the combined qubits comprise auxiliary qubits and system qubits of a target quantum system, the computer device is configured to:

acquire and measure the output quantum state of the parameterized quantum circuit for n times to obtain n sets of measurement results, wherein each set of measurement results comprises:

first measurement results corresponding to the system qubits, second measurement results corresponding to the auxiliary qubits, wherein n is a positive integer and the first measurement results and the second measurement results are in a one-to-one mapping;

process the second measurement results through a neural network to obtain weight parameters, wherein the weight parameters are used to characterize a probability in a mixed state of the target quantum system;

compute a correlation function value of the mixed state of the target quantum system based on the weight parameters and the first measurement results;

compute an expected value of an objective function based on the correlation function value of the mixed state;

adjust variational parameters by taking an expected value convergence of the objective function as a goal; and acquire, under a condition that the expected value of the objective function satisfies a convergence condition, the mixed state of the target quantum system to characterize a thermalized state of the target quantum system, wherein the variational parameters comprise at least one of: parameters of the parameterized quantum circuit, or parameters of the neural network.

* * * * *